US012749356B2

(12) United States Patent
Gilbert-Eyres et al.

(10) Patent No.: US 12,749,356 B2
(45) Date of Patent: Sep. 29, 2026

(54) VEHICLE HAZARD MONITORING SYSTEM

(71) Applicant: GM Global Technology Operations LLC, Detroit, MI (US)

(72) Inventors: Matthew Edward Gilbert-Eyres, Rochester Hills, MI (US); Eric T. Hosey, Rochester Hills, MI (US); Russell A. Patenaude, Macomb Township, MI (US); Robert Myers, Canton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 88 days.

(21) Appl. No.: 18/676,381

(22) Filed: May 28, 2024

(65) Prior Publication Data

US 2025/0371917 A1 Dec. 4, 2025

(51) Int. Cl.
*G07C 5/08* (2006.01)
*G07C 5/00* (2006.01)

(52) U.S. Cl.
CPC .......... *G07C 5/0816* (2013.01); *G07C 5/008* (2013.01); *G07C 5/0808* (2013.01)

(58) Field of Classification Search
None
See application file for complete search history.

(56) References Cited

U.S. PATENT DOCUMENTS

| | | | | |
|---|---|---|---|---|
| 11,682,242 | B1 * | 6/2023 | Ali | B60Q 1/52 701/36 |
| 11,950,316 | B1 * | 4/2024 | Nalevanko | H04W 4/40 |
| 2020/0269995 | A1 * | 8/2020 | Beaven | G07C 5/008 |

* cited by examiner

*Primary Examiner* — Brandon D Lee
(74) *Attorney, Agent, or Firm* — Honigman LLP; Matthew H. Szalach

(57) ABSTRACT

A computer-implemented method when executed by data processing hardware causes the data processing hardware to perform operations. The operations include monitoring, via a hazard monitoring algorithm, for a trigger event, detecting, via the hazard monitoring algorithm, the trigger event, and generating, based on the trigger event, a confidence score. The operations also include determining, based on the confidence score, a hazard probability level, executing, via the hazard monitoring algorithm, a communication function, and executing, based on the hazard probability level, at least one of an instruction function and a triage function.

20 Claims, 6 Drawing Sheets

VEHICLE HAZARD MONITORING SYSTEM

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to a hazard monitoring system for a vehicle.

Vehicles are equipped with sensors to monitor and detect impact events, collisions, or other events that may result in airbag deployment. Often, smoke will emit as a result of the airbag deployment, but the smoke may be unrelated to fire related smoke. Many vehicle systems could benefit from improved capability to detect and distinguish between various types of smoke. For example, while vehicles may detect the presence of smoke, the vehicles may not differentiate between types of smoke. Further, many users are unfamiliar with the different types of smoke and may find it challenging to make an informed decision as to how to proceed. Thus, there is a need for an improved system for monitoring for hazard conditions, such as the presence of smoke, and providing information to the user and first responders as to the status of the vehicle.

SUMMARY

In some aspects, a computer-implemented method when executed by data processing hardware causes the data processing hardware to perform operations. The operations include monitoring, via a hazard monitoring algorithm, for a trigger event, detecting, via the hazard monitoring algorithm, the trigger event, and generating, based on the trigger event, a confidence score. The operations also include determining, based on the confidence score, a hazard probability level, executing, via the hazard monitoring algorithm, a communication function, and executing, based on the hazard probability level, at least one of an instruction function and a triage function.

In some examples, detecting the trigger event may include receiving event data from at least one sensor of a vehicle. Optionally, the event data may include one or more of smoke, an impact speed, an airbag deployment, a collision type, and active diagnostic type codes. In some instances, determining the hazard probability level may include executing a logic check, the hazard probability level including one of a low level, an intermediate level, and a high level. Additionally or alternatively, executing the logic check may include identifying a diagnostic type code.

In some configurations, executing the communication function may include executing an emergency communication with a third-party responder. Optionally, executing the triage function may include outputting triage questions and determining, based on a user response, an instruction of the instruction function. In some instances, generating the confidence score includes determining, based on event data, a smoke source.

In other aspects, a hazard monitoring system includes data processing hardware and memory hardware in communication with the data processing hardware. The memory hardware stores instructions that, when executed on the data processing hardware, cause the data processing hardware to perform operations. The operations include monitoring, via a hazard monitoring algorithm, for a trigger event, detecting, via the hazard monitoring algorithm, the trigger event, and generating, based on the trigger event, a confidence score. The operations also include determining, based on the confidence score, a hazard probability level, executing, via the hazard monitoring algorithm, a communication function, and executing, based on the hazard probability level, at least one of an instruction function and a triage function.

In some examples, detecting the trigger event includes receiving event data from at least one sensor of a vehicle. Optionally, the event data may include one or more of smoke, an impact speed, an airbag deployment, a collision profile, and active diagnostic type codes. In some instances, determining the hazard probability level may include executing a logic check, the hazard probability level including one of a low level, an intermediate level, and a high level. Additionally or alternatively, executing the logic check may include identifying a diagnostic type code.

In some configurations, executing the communication function may include executing an emergency communication with a third-party responder. Optionally, executing the triage function may include outputting triage questions and determining, based on a user response, an instruction of the instruction function. In further examples, generating the confidence score may include determining, based on event data, a smoke source.

In further aspects, a hazard monitoring system for a vehicle includes data processing hardware and memory hardware in communication with the data processing hardware. The memory hardware stores instructions that, when executed on the data processing hardware, cause the data processing hardware to perform operations. The operations include monitoring, via a hazard monitoring algorithm, for a trigger event, detecting, via the hazard monitoring algorithm, the trigger event, and receiving, based on the trigger event, event data from a sensor system of the vehicle, the event data including at least one or more of smoke data, an impact speed, an airbag deployment, a collision profile, and active diagnostic type codes. The operations also include generating, based on the trigger event, a confidence score, determining, based on the confidence score, a hazard probability level, executing, via the hazard monitoring algorithm, a communication function, and executing, based on the hazard probability level, at least one of an instruction function and a triage function.

In some examples, generating the confidence score may include determining at least one of a smoke color, a smoke location, and a smoke acceleration from the smoke data. The operations may also include executing, via the hazard monitoring algorithm, a logic check and comparing the event data with the executed logic check. Optionally, executing the communication function may include communicating at least one of the event data and the hazard probability level with a third-party responder.

BRIEF DESCRIPTION OF THE DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Figure 1:
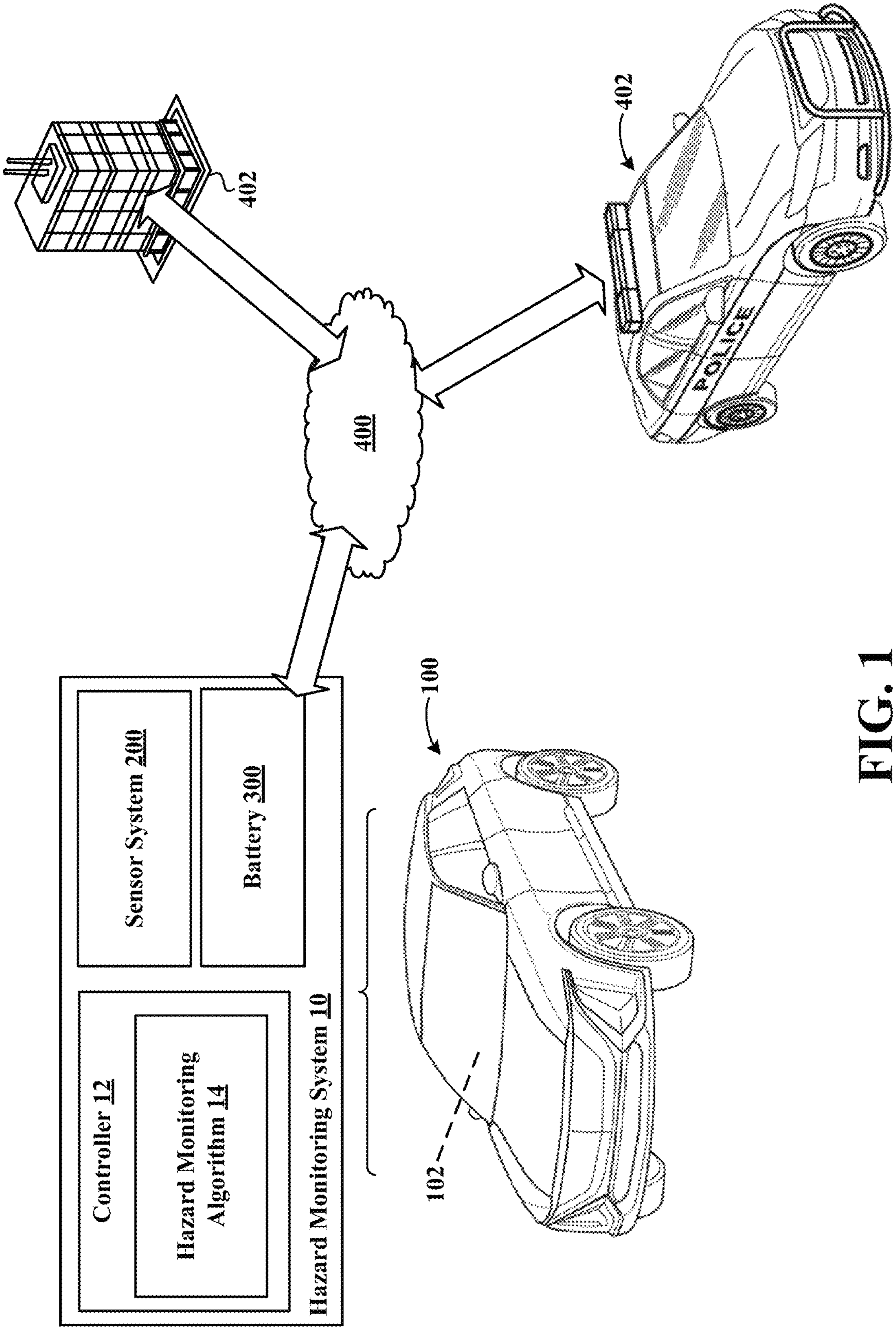
FIG. 1 is a schematic diagram of a hazard monitoring system according to the present disclosure.
Figure 2:
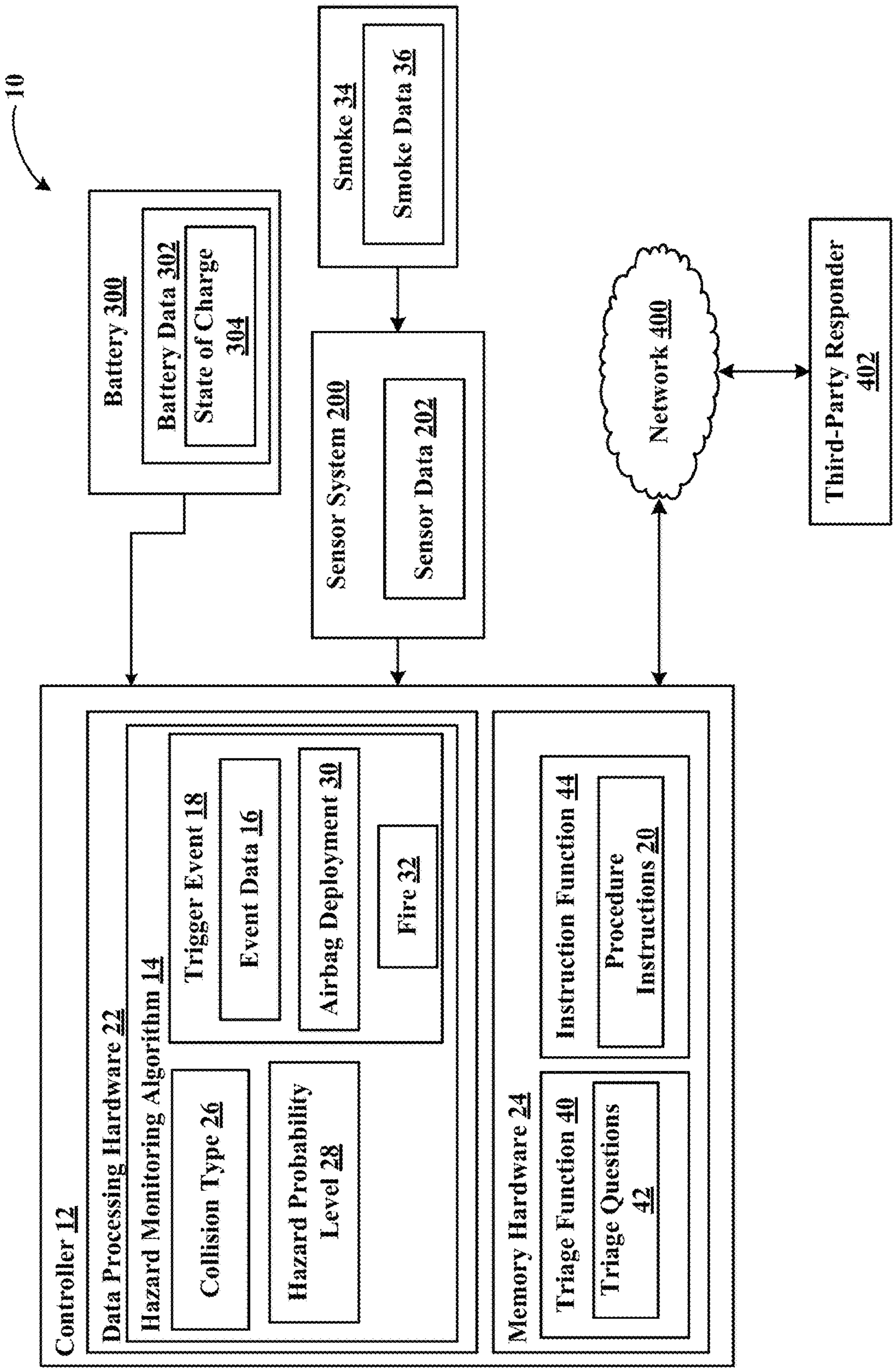
FIG. 2 is an exemplary block diagram for a hazard monitoring system according to the present disclosure.
Figure 3:
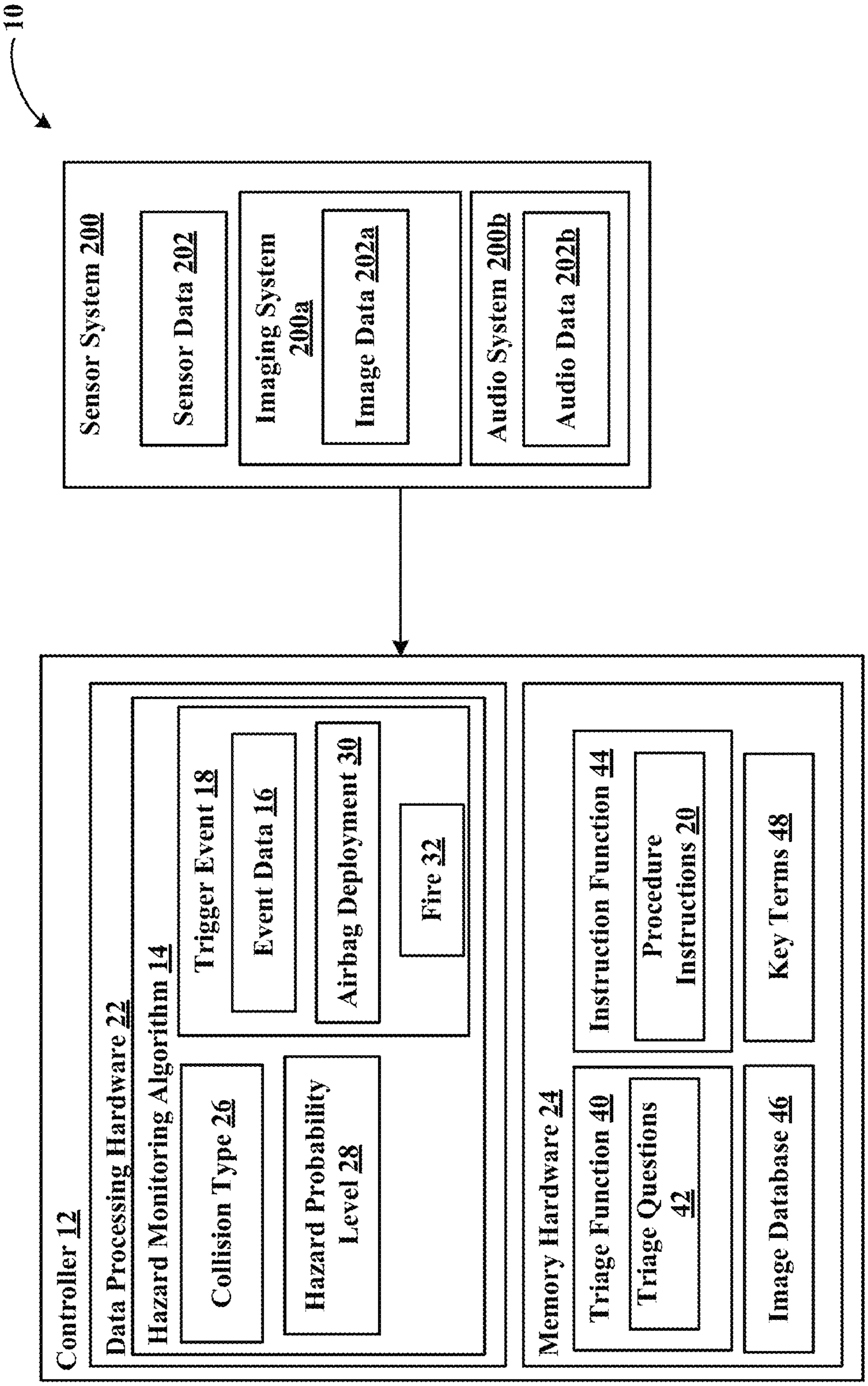
FIG. 3 is another exemplary block diagram for a hazard monitoring system according to the present disclosure.
Figure 4:
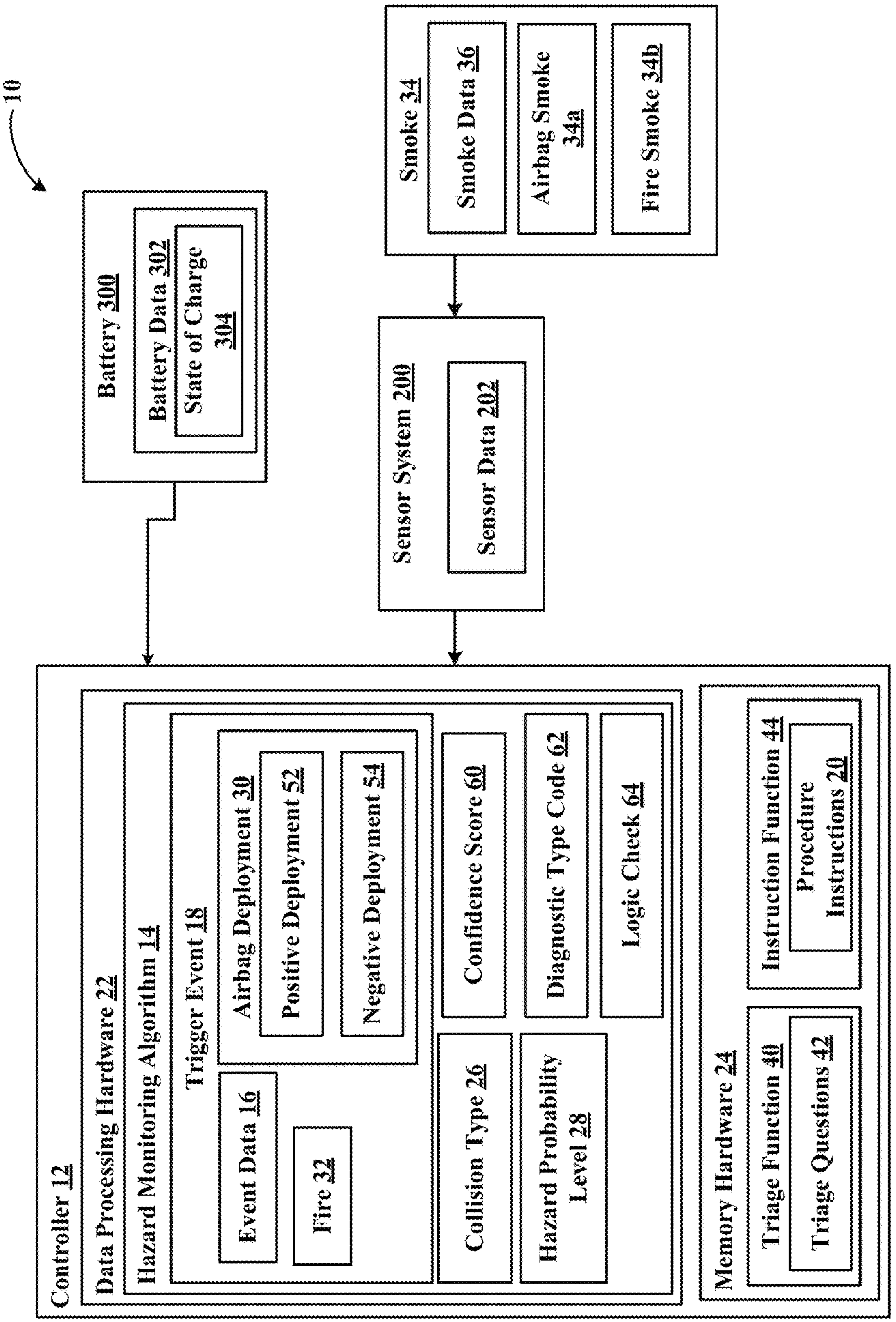
FIG. 4 is a further exemplary block diagram for a hazard monitoring system according to the present disclosure.
Figure 5:
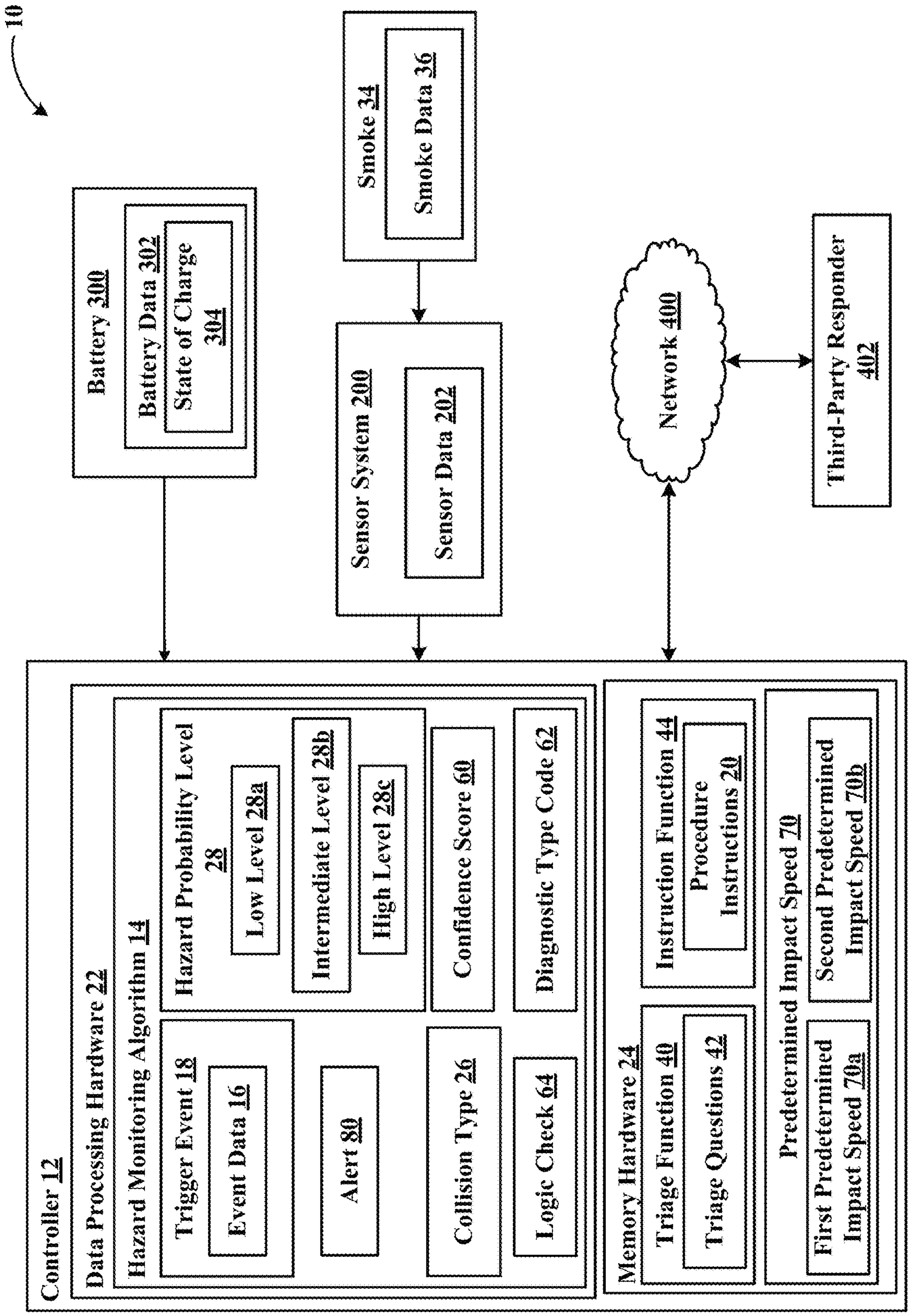
FIG. 5 is another exemplary block diagram for a hazard monitoring system according to the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second," "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term "module" may be replaced with the term "circuit." The term "module" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICS (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Referring to FIGS. 1-6, a hazard monitoring system 10 is configured for a vehicle 100 and includes a controller 12 of the vehicle 100 that is configured with a hazard monitoring algorithm 14. The hazard monitoring system 10 also includes a sensor system 200 of the vehicle 100 configured to communicate sensor data 202 with the controller 12, which includes external data and internal data of the vehicle 100, described below. The controller 12 is also in communication with a battery 300 of the vehicle 100 to receive battery data 302. Each of the sensor data 202 and the battery data 302 are used, at least in part, to collectively define event data 16 of a trigger event 18, described below. The hazard monitoring system 10 is configured to advantageously monitor for and detect the trigger event 18 and utilize the event data 16 to communicate procedure instructions 20 with an occupant(s), described herein. The hazard monitoring system 10 is configured to advantageously assist the user in navigating a trigger event 18 where the user may otherwise be unsure how to proceed.

Referring still to FIGS. 1-6, the vehicle 100 is communicatively coupled, via a network 400, to third-party responders 402 as part of the hazard monitoring system 10. The third-party responders 400 may be first responder vehicles and/or may be a dispatch office configured to contact a first responder vehicle. For example, the controller 12 of the vehicle 100 may communicate the event data 16 analyzed by the hazard monitoring algorithm 14, described herein, with the third-party responders 402 in response to the trigger event 18. The third-party responders 402 may communicate with an occupant of the vehicle 100 and provide information and potential instructions for the occupant based on the hazard monitoring algorithm 14.

With specific reference to FIGS. 2-5, the hazard monitoring algorithm 14 is executed by data processing hardware 22 of the controller 12. The controller 12 also includes memory hardware 24 that is in communication with the data processing hardware 22. The memory hardware 24 stores instructions that, when executed on the data processing hardware 22, cause the data processing hardware 22 to perform operations, described herein. The memory hardware 24 may store collision types 26 corresponding to potential trigger events 18. The collision types 26 may be preprogrammed as part of the hazard monitoring algorithm 14 or may be learned by the hazard monitoring algorithm 14, such that the hazard monitoring algorithm 14 may be periodically updated. The collision types 26 may include, but are not limited to, a rear-end collision, a side collision, a front-end collision, and/or a roll-over collision. The collision types 26 may be identified by the event data 16 and may assist the hazard monitoring algorithm 14 in determining a hazard probability level 28 of the trigger event 18, described below.

The trigger event 18 may include, but is not limited to, an impact event, an airbag deployment, and/or a fire event. In some instances, the trigger event 18 may result in one or more of airbag deployment 30 and/or a fire 32 in response to an impact event. For example, the trigger event 18 may be a result of a collision. The trigger event 18 may, thus, be at least partially dependent on the collision type 26. The trigger event 18 may, in some examples, result in smoke 34 being present within or around the vehicle 100. The sensor system 200 may capture the smoke 34 as smoke data 36 and communicate the smoke data 36 as part of the sensor data 202 with the hazard monitoring algorithm 14. While the smoke data 36 may be attributed to various incidents and aspects of a vehicle, for purposes of this disclosure the smoke data 36 may be attributed to at least one of the airbag deployment 30 and the fire 32. The smoke data 36 may thus be analyzed by the hazard monitoring algorithm 14 as part of the event data 16, as the smoke data 36 is likely related to the trigger event 18.

With further reference to FIGS. 2-5, the hazard monitoring algorithm 14 is configured with a triage function 40 stored in the memory hardware 24 and includes triage questions 42. The memory hardware 24 may also store an instruction function 44 of the hazard monitoring algorithm 14 that includes the procedure instructions 20 provided to the third-party responder 402 and/or the occupant of the vehicle 100 based on the hazard probability level 28. In some instances, the triage function 40 and the instruction function 44 may be collectively or individually referred to as a communication function. The hazard monitoring algorithm 14 gathers the event data 16 in response to the trigger event 18, mentioned above, based at least in part on the sensor data 202, which may be captured by various monitoring systems of the vehicle 100.

For example, the sensor system 200 may include an imaging system 200*a* and a speaker system 200*b*. The imaging system 200*a* may capture image data 202*a* that may be compared with an image database 46 stored on the memory hardware 24 of the controller 12. The image database 46 may include a range of smoke colors and locations corresponding to at least one of the airbag deployment 30 and fire 32. For example, images stored on the image database 46 may reflect smoke 34 having a lighter color and emitting only from within an interior cabin 102 of the vehicle 100 when the trigger event 18 is associated with the airbag deployment 30. Comparatively, the images of the smoke 34 stored on the image database 46 associated with the fire 32 may be darker or more variable in color and may be both within the interior cabin 102 and exterior to the vehicle 100. The hazard monitoring algorithm 14 is configured to compare the smoke data 36 with the image data 202*a* and with the image database 46 to distinguish between airbag smoke 34*a* and fire smoke 34*b*. The speaker system 200*b* may be configured to capture audio data 202*b* that may be compared with key terms 48 stored in the memory hardware 24.

In addition to the image data 202*a* and the audio data 202*b*, the sensor data 202 may include a delta velocity of the vehicle 100, pretensioner deployment, activation of an emergency button of the vehicle 100, a speed of impact, and acceleration of smoke. Thus, the sensor data 202 may be utilized in combination with other event data 16 by the hazard monitoring algorithm 14 to determine the collision type 26. For example, the hazard monitoring algorithm 14 may receive the battery data 302, the smoke data 36, and the airbag deployment 30. The airbag deployment 30 may indicate a positive deployment 52 or a negative deployment 54, where the positive deployment 52 corresponds with the trigger event 18. The negative deployment 54 may also be associated with the trigger event 18, but may be associated with a low impact collision type 26, such that the hazard monitoring algorithm 14 may at least partially identify the collision type 26 based on the negative deployment 54.

Referring still to FIGS. 2-5, the hazard monitoring algorithm 14 generates a confidence score 60, described below, in response to the trigger event 18 that corresponds to a smoke source. The confidence score 60 may be used in combination with a diagnostic type code 62 generated by the hazard monitoring system 10 to determine the hazard probability level 28. The hazard probability level 28 is determined by the hazard monitoring algorithm 14 to indicate a probable severity of the trigger event 18. The hazard probability level 28 includes a low level 28*a*, an intermediate level 28*b*, and a high level 28*c*.

The hazard monitoring algorithm 14 may also execute a logic check 64 when determining the hazard probability level 28. The logic check 64 is used to identify the diagnostic type code 62. The diagnostic type code 62 may inform the criticality of the trigger event 18. For example, the diagnostic type code 62 may categorize the trigger event 18 as critical or non-critical. Some examples of critical diagnostic type codes 64 include, but are not limited to, a random cylinder(s) misfire, evaporative emission system leak detected, system voltage low, and/or a voltage of the battery 300 being out of range. Based on the diagnostic type code 62, the hazard monitoring algorithm 14 may assign the hazard probability level 28 based on whether the diagnostic type code 62 identifies the trigger event 18 as being critical or non-critical. It is contemplated that the low and intermediate levels 28*a*, 28*b* may be associated with a non-critical diagnostic type code 62 and the high level 28*c* may be associated with the critical diagnostic type code 62. Thus, if the hazard monitoring algorithm 14 identifies a critical diagnostic code 62, then the hazard monitoring algorithm 14 executes the high level 28*c* of the hazard monitoring system 10.

Referring to FIGS. 2-5, the hazard monitoring algorithm 14, regardless of the hazard probability level 28, executes the instruction function 44 to contact the third-party responder 402 to provide procedure instructions 20 to the occupant(s). For example, the hazard monitoring algorithm 14 may execute an emergency communication with the third-party responder. While executing the instruction function 44, the hazard monitoring algorithm 14 determines the hazard probability level 28. Each of the hazard probability levels 28 may have different executions by the hazard monitoring algorithm 14, while each includes execution of the instruction function 44 to communicate with the third-party responders 402.

As mentioned above, the low level 28*a* corresponds to the non-critical diagnostic type code 62. For example, the event data 16 may indicate that a speed of impact is less than a predetermined impact speed 70 stored on the memory hardware and there is a negative deployment 54 of the airbag deployment 30. The hazard monitoring algorithm 14 may also identify that the collision type 26 is one of a rear-end impact and a side impact, which, in combination with the other event data 16, may correspond to a low level 28*a*. As a result, the hazard monitoring algorithm 14 may execute a low level 28*a* response corresponding to the execution of the instruction function 44. The third-party responder 402 receives the procedure instructions 20 corresponding to the low level 28*a* response and may provide the procedure instructions 20 to the occupant(s) to remain in the vehicle 100 until a first responder arrives.

The intermediate level 28*b* may also correspond to the non-critical diagnostic type code 62, but may include other event data 16 that corresponds to executing the triage function 40 in addition to the instruction function 44. For example, the speed of impact may be greater than a first predetermined impact speed 70*a*, but less than a second predetermined impact speed 70*b*. The second predetermined impact speed 70*b* may generally be defined as a threshold impact speed that triggers the high level 28*c*, described below. In addition, the hazard monitoring algorithm 14 may determine that the airbag deployment 30 was positive (i.e., positive deployment 52) and receives the smoke data 36. The collision type 26 may also include one of a rear-end collision, a side collision, and/or a front-end collision.

With respect to the smoke data 36, the hazard monitoring algorithm 14 may utilize the other sensor data 202 to evaluate the smoke data 36. For example, the image data 202*a* may indicate a color of the smoke 34 and a location of the smoke 34. The audio data 202*b* may also provide information that may be used to inform the smoke data 36 by identifying the key terms 48 associated with the smoke data 36. For example, the occupant(s) may comment on the color, smell, and location of the smoke. Each of these examples may be compared with the key terms 48 stored in the memory hardware 24 to identify the intermediate level 28*b*. For example, the smoke data 36 may be determined to have a light color and may be located inside the interior cabin 102, such that the smoke 34 is associated with the airbag deployment 30 and unlikely related to a fire 32.

Once the intermediate level 28*b* is determined and the instruction function 44 is executed, the hazard monitoring algorithm 14 may execute the triage function 40 and communicate, via the network 400, the triage questions 42 with the third-party responder 402. In some examples, the third-party responder 402 may receive a notification from the hazard monitoring algorithm 14 that the triage function 40 has been executed, and the third-party responder 402 may proceed with asking triage questions 42. The triage questions 42 may relate to, but are not limited to, the smell of the smoke 34, the identification of flames, a color of the smoke 34, and change in smoke color. The third-party responder 402 may determine, based on the answers received from the occupant(s), whether a fire 32 is indicated.

As mentioned above, the smoke data 36 may include airbag smoke 34*a* and fire smoke 34*b*. In some instances, an occupant may find difficulty in distinguishing between the airbag smoke 34*a* and the fire smoke 34*b*, and the third-party responder 402 may assist in distinguishing between the two. For example, the airbag smoke 34*a* may be lighter in color and have a chemical smell. In comparison, the fire smoke 34*b* may be darker and have a plastic and/or wood smell. Further, the airbag smoke 34*a* may be contained or limited to the interior cabin 102 of the vehicle 100, such that the presence of smoke 34 exterior to the vehicle 100 is likely associated with fire smoke 34*b* rather than airbag smoke 34*a*. If the answers to the triage questions 42 indicate the smoke data 36 is associated with airbag smoke 34*a*, then the occupant(s) may be advised to remain in the vehicle 100 until a first responder arrives. If the answers to the triage questions 42 indicate that the smoke data 36 is associated with fire smoke 34*b*, then the occupant(s) are advised to exit the vehicle 100 and find a safe location.

With further reference to FIGS. 2-5, the hazard monitoring algorithm 14 may determine that the trigger event 18 is associated with the high level 28*c*. The high level 28*c*, in some instances, may be associated with critical diagnostic type code 62, such that one or more critical diagnostic type codes 64 may be active. In some examples, the high level 28*c* may also be determined by the speed of impact being greater than or equal to the second predetermined impact speed, mentioned above. In addition, the smoke data 36 may reflect that smoke is detected both within the interior cabin 102 and exterior to the vehicle 100, the smoke 34 is varying in color, and accumulation of the smoke 34 is accelerating.

Further, the battery data 302 may reflect that a state of charge 304 of the battery 300 is dropping at a rapid rate. A rapid loss of the state of charge 304 may indicate that there is an issue with the battery 300, which may be a source or result of a potential fire. However, a change in the state of charge 304 may be a result of a separate issue with the battery 300, so the hazard monitoring algorithm 14 compares the battery data 302 with the other event data 16 received. For example, the hazard monitoring algorithm 14 may detect that a temperature of the interior cabin 102 is rising and may identify the collision type 26 of the trigger event 18 to be a high level 28*c* collision, such as a rollover.

In some instances, the event data 16 may include the audio data 202*b* which may capture words spoken by the occupant(s). The audio data 202*b* may include one or more of the key terms 48 stored in the memory hardware 24, such as fire, hot, etc. As mentioned above, the event data 16 may also include the image data 202*a* that includes images from the interior cabin 102 and exterior to the vehicle 100. The image data 202*a* may show that the smoke 34 is within the interior cabin 102 and exterior to the vehicle 100 and has a varied color consistent with fire smoke 34*b*, based on the image database 46. The hazard monitoring algorithm 14 may also compare the image data 202*a* with the smoke data 36 and may determine whether there is an acceleration of the smoke.

If the hazard monitoring algorithm 14 determines that the trigger event 18 corresponds to the high level 28*c*, then the hazard monitoring algorithm 14, in addition to executing the instruction function 44, indicates to the occupant(s) to exit the vehicle 100 and seek safety. For example, the hazard monitoring algorithm 14 may issue an alert 80 that indicates to the occupant(s) to exit the vehicle 100. Additionally or alternatively, the hazard monitoring algorithm 14 may communicate the high level 28*c* of the trigger event 18 with the third-party responder 402, and the third-party responder 402 may instruct the occupant(s) to exit the vehicle 100.

Figure 6:
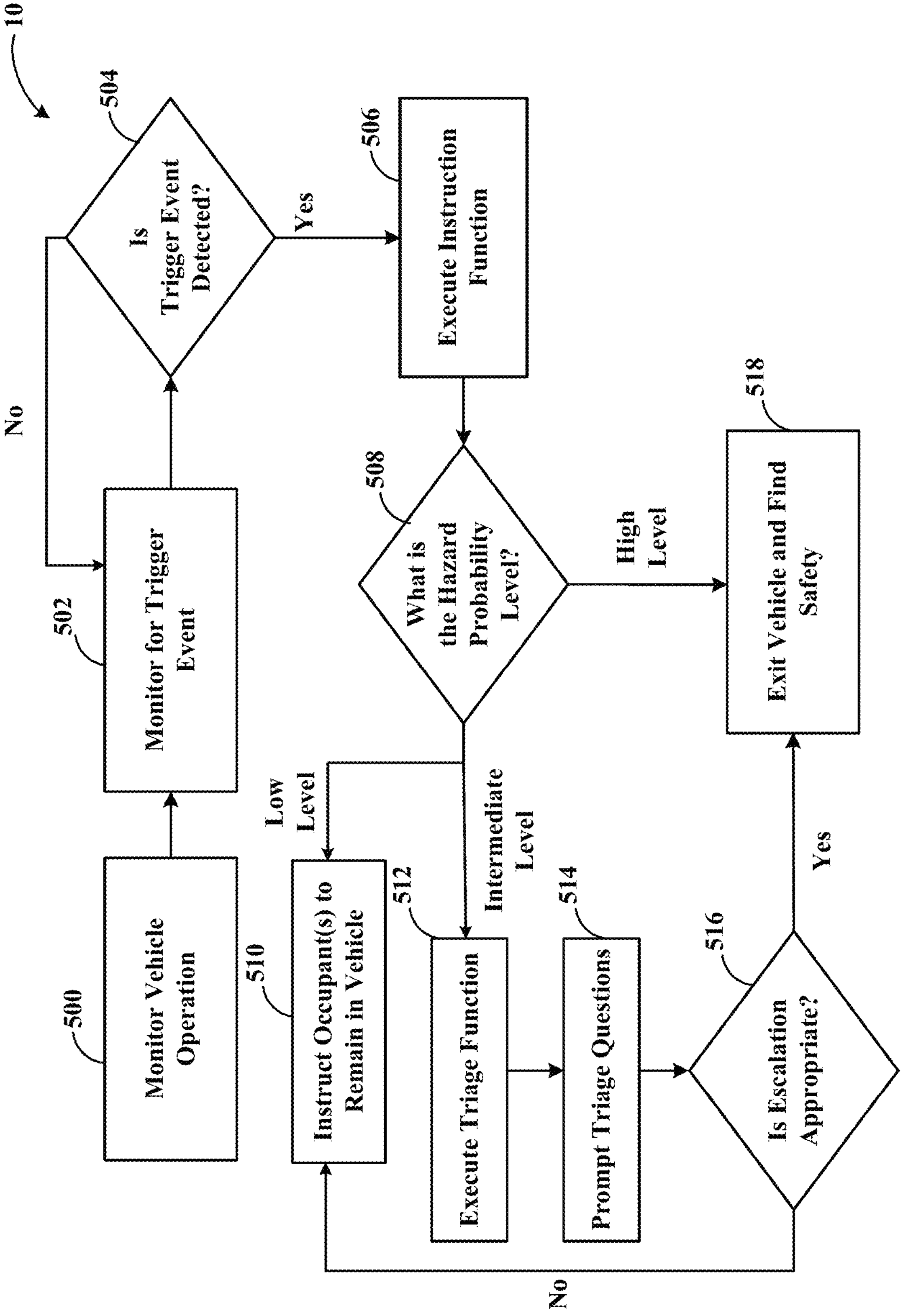
FIG. 6 is an exemplary flow diagram for a hazard monitoring system according to the present disclosure.

Referring to FIGS. 6-8, exemplary flow diagrams of the hazard monitoring system 10 are illustrated. At 500, the hazard monitoring system 10 monitors the vehicle 100 during operation and, at 502, monitors for a trigger event 18. The hazard monitoring system 10 determines, at 504, whether a trigger event 18 is detected. If not, then the hazard monitoring system 10 continues to monitor for a trigger event 18 while the vehicle 100 is operating. If a trigger event 18 is detected, then the hazard monitoring system 10, at 506, executes the instruction function 44 and, at 508, determines the hazard probability level 28. If a low level 28*a* is determined, then the hazard monitoring system 10, at 510, instructs the occupant(s) to remain in the vehicle 100 via the third-party responder 402. If an intermediate level 28*b* is determined, then the hazard monitoring system 10 executes, at 512, the triage function 40 and, via the third-party responders 402, prompts, at 514, the occupant(s) with triage questions 42.

The hazard monitoring system 10 determines, at 516, based on the answers from the user, whether to escalate to a high level 28*c*. If no escalation, then the third-party responder 402 may instruct, at 510, the occupant(s) to remain in the vehicle 100. If escalated, then the third-party responder, at 518, instructs the occupant(s) to exit the vehicle 100 and find safety. Similarly, if the hazard monitoring system 10 determines a high level 28*c*, then the occupant(s) are instructed, at 518, to exit the vehicle 100 and find safety.

Referring again to FIGS. 1-6, the hazard monitoring system 10 advantageously monitors the vehicle 100 for trigger events 18 and, when detected, assesses the trigger event 18. The assessment assists in identifying a hazard probability level 28, which assists the third-party responders 400 in navigating the trigger event 18. For example, the third-party responders 400 can adjust a response based on the hazard probability level 28 determined by the hazard monitoring algorithm 14. The integration of the hazard monitoring algorithm 14 within the controller 12 of the vehicle 100 provides the hazard monitoring algorithm 14 with access to the various sensor systems 200 and the battery 300 of the vehicle 100 to maximize the efficiency of obtaining the sensor and battery data 202, 302, respectively. Thus, the hazard monitoring algorithm 14 may have improved capability in identifying a potential hazard and assign a respective level 28 to improve efficiency in responding to the trigger event 18.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A computer-implemented method when executed by data processing hardware causes the data processing hardware to perform operations comprising:

monitoring, via a hazard monitoring algorithm of a hazard monitoring system of a vehicle, for a trigger event;

detecting, via the hazard monitoring algorithm, the trigger event;

capturing, via a speaker system of the vehicle, audio data;

comparing the captured audio data with key terms stored in memory hardware of the hazard monitoring system;

generating, based on the trigger event, a confidence score;

determining, based on the confidence score and active diagnostic type codes, a hazard probability level;

categorizing, via the hazard monitoring algorithm, the trigger event as one of a critical diagnostic type code or a non-critical diagnostic type code;

executing, via the hazard monitoring algorithm, a communication function; and executing, based on the hazard probability level, at least one of an instruction function and a triage function, the instruction function including instructing, based on the trigger event, an occupant of the vehicle to take an action including one of remaining in the vehicle or exiting the vehicle.

2. The method of claim 1, wherein detecting the trigger event includes receiving event data from at least one sensor of the vehicle.

3. The method of claim 2, wherein the event data includes one or more of smoke, an impact speed, an airbag deployment, a collision type, and the active diagnostic type codes.

4. The method of claim 1, wherein determining the hazard probability level includes executing a logic check, the hazard probability level including one of a low level, an intermediate level, and a high level.

5. The method of claim 4, wherein executing the logic check includes identifying a diagnostic type code.

6. The method of claim 1, wherein executing the communication function includes executing an emergency communication with a third-party responder.

7. The method of claim 1, wherein executing the triage function includes outputting triage questions and determining, based on a user response, an instruction of the instruction function.

8. The method of claim 1, wherein generating the confidence score includes determining, based on event data, a smoke source.

9. A hazard monitoring system comprising:

data processing hardware; and memory hardware in communication with the data processing hardware, the memory hardware storing instructions that when executed on the data processing hardware cause the data processing hardware to perform operations comprising:

monitoring, via a hazard monitoring algorithm, for a trigger event;

detecting, via the hazard monitoring algorithm, the trigger event;

capturing, via a speaker system of a vehicle, audio data;

comparing the captured audio data with key terms stored in the memory hardware;

generating, based on the trigger event, a confidence score;

determining, based on the confidence score and active diagnostic type codes, a hazard probability level;

categorizing, via the hazard monitoring algorithm, the trigger event as one of a critical diagnostic type code or a non-critical diagnostic type code;

executing, via the hazard monitoring algorithm, a communication function; and executing, based on the hazard probability level, at least one of an instruction function and a triage function, the instruction function including instructing, based on the trigger event, an occupant of the vehicle to take an action including one of remaining in the vehicle or exiting the vehicle.

10. The hazard monitoring system of claim 9, wherein detecting the trigger event includes receiving event data from at least one sensor of the vehicle.

11. The hazard monitoring system of claim 10, wherein the event data includes one or more of smoke, an impact speed, an airbag deployment, a collision profile, and the active diagnostic type codes.

12. The hazard monitoring system of claim 9, wherein determining the hazard probability level includes executing a logic check, the hazard probability level including one of a low level, an intermediate level, and a high level.

13. The hazard monitoring system of claim 12, wherein executing the logic check includes identifying a diagnostic type code.

14. The hazard monitoring system of claim 9, wherein executing the communication function includes executing an emergency communication with a third-party responder.

15. The hazard monitoring system of claim 9, wherein executing the triage function includes outputting triage questions and determining, based on a user response, an instruction of the instruction function.

16. The hazard monitoring system of claim 9, wherein generating the confidence score includes determining, based on event data, a smoke source.

17. A hazard monitoring system for a vehicle, the hazard monitoring system comprising:

data processing hardware; and memory hardware in communication with the data processing hardware, the memory hardware storing instructions that when executed on the data processing hardware cause the data processing hardware to perform operations comprising:

monitoring, via a hazard monitoring algorithm, for a trigger event;

detecting, via the hazard monitoring algorithm, the trigger event;

capturing, via a speaker system of the vehicle, audio data;

comparing the captured audio data with key terms stored in the memory hardware;

receiving, based on the trigger event, event data from a sensor system of the vehicle, the event data including at least one or more of smoke data, an impact speed, an airbag deployment, a collision profile, and active diagnostic type codes;

generating, based on the trigger event, a confidence score;

determining, based on the confidence score and active diagnostic type codes, a hazard probability level;

categorizing, via the hazard monitoring algorithm, the trigger event as one of a critical diagnostic type code or a non-critical diagnostic type code;

executing, via the hazard monitoring algorithm, a communication function; and executing, based on the hazard probability level, at least one of an instruction function and a triage function, the instruction function including instructing, based on the trigger event, an occupant of the vehicle to take an action including one of remaining in the vehicle or exiting the vehicle.

18. The hazard monitoring system of claim 17, wherein generating the confidence score includes determining at least one of a smoke color, a smoke location, and a smoke acceleration from the smoke data.

19. The hazard monitoring system of claim 18, further including executing, via the hazard monitoring algorithm, a logic check and comparing the event data with the executed logic check.

20. The hazard monitoring system of claim 18, wherein executing the communication function includes communicating at least one of the event data and the hazard probability level with a third-party responder.

* * * * *